United States Patent
Minamino

(10) Patent No.: US 6,714,322 B1
(45) Date of Patent: Mar. 30, 2004

(54) IMAGE PROCESSING APPARATUS, IMAGE PROCESSING METHOD, AND STORAGE MEDIUM THEREFOR

(75) Inventor: Katsushi Minamino, Kyoto (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 0 days.

(21) Appl. No.: 09/443,514

(22) Filed: Nov. 19, 1999

(30) Foreign Application Priority Data

Nov. 19, 1998 (JP) .......................... 10-329372
Feb. 2, 1999 (JP) .......................... 11-024898

(51) Int. Cl.⁷ .............................. G06K 9/34
(52) U.S. Cl. .................. 358/456; 358/1.9; 358/3.01; 358/3.13; 358/3.23; 358/466; 358/534; 382/173; 382/174; 382/270
(58) Field of Search .................. 358/456, 1.9, 534, 358/3.01, 3.13, 3.1, 3.2, 3.19, 3.23, 466; 382/254, 270, 173, 174

(56) References Cited

U.S. PATENT DOCUMENTS 4,124,870 A * 11/1978 Schatz et al. .............. 358/3.29
4,703,318 A * 10/1987 Haggerty .................... 345/634

(List continued on next page.)

FOREIGN PATENT DOCUMENTS

| DE | DT2358899 A1 | * | 5/1975 | ............ G06K/9/16 |
| JP | 62149270 | * | 3/1987 | ............ H04N/1/46 |
| JP | 10222602 | * | 8/1998 | ............ G06K/9/03 |

OTHER PUBLICATIONS

Seeger, M.; Dance, C.; Binarising camera images for OCR, Sep. 10–13, 2001, Document Analysis and Recognition, 2001. Proceedings. Sixth International Conference on, pp. 54–58.*

Manay, S.; Yezzi, A.; Anti–geometric diffusion ofr adaptive thresholding and segmentation, Oct. 7–10, 2001, Image Processing, 2001. Proceedings. 2001 International Conference on, vol.: 2, pp 829–832.*

Sauvola, J.; Seppanen, T.; Haapakoski, S.; Pietikainen, M.; Adaptive document binarization, Aug. 18–20, 1997, Document Analysis and Recognition, 1997., Proceedings of the Fourth International Conference on, vol. 1, pp 147–152.*

Liu, Ying,; Srihari, Sargur; Document Image Binarization Based on Texture Features, May, 1997; Pattern Analysis and Machine Intelligence, IEEE Transactions on, vol. 19 Issue 5, pp 540–544.*

Liu, Ying,; Fenrich, Richard,; and Srihari, Sargur, N.; An Object Attribute Thresholding Algorithm for Document Image Binarization, 1993, IEEE, pp. 278–281.*

Dunn, Dennis, F.; Weldon, Thomas, P.; and Higgins, William, E.; Extracting Halftones From Printed Documents Using Texture Analysis, 1996, IEEE, pp. 225–228.*

Abak, A.T.,; Baris, U.; Sankur, B.; The Performance Evaluation of Thresholding Algorithms for Optical Character Recognition, 1997, IEEE, pp. 697–700.*

Sankur, B.; Abak, A.T.; and Baris, U.; Assessment of Thresholding Algorithms for Document Processing, 1999, IEEE, 580–584.*

O'Gorman, Lawrence; Experimental Comparisons of Binarization and Multi–Thresholding Methods on Document Images, 1994, IEEE, pp. 395–398.*

Primary Examiner—Kimberly Williams
Assistant Examiner—Melanie Vida
(74) Attorney, Agent, or Firm—Hogan & Hartson, LLP

(57) ABSTRACT

ROM stores an 8×8 base matrix of 64 sequential threshold values (1–64), hexadecimal data for a specified pattern to be rendered on an output image, and a threshold address table in which the thresholds of the base matrix are arranged in ascending order of threshold value. The MPU generates a second threshold matrix used to render the specified pattern when the matrix is used by dithering unit to dither a source image having a wide range of gray-scale levels.

9 Claims, 8 Drawing Sheets

CHARACTER PATTERN WITH SHADING : PA

BOLD FONT PATTERN DATA

| BINARY | HEXADECIMAL |
|---|---|
| 00000000 | 0 × 00 |
| 00011100 | 0 × 1c |
| 00110110 | 0 × 36 |
| 00110110 | 0 × 36 |
| 00111110 | 0 × 3e |
| 01100011 | 0 × 63 |
| 01100011 | 0 × 63 |
| 00000000 | 0 × 00 |

SHADING PATTERN : P2

BACKGROUND PATTERN : P3

U.S. PATENT DOCUMENTS

| | | | |
|---|---|---|---|
| 4,916,545 A | * | 4/1990 | Granger ........................ 358/3.26 |
| 4,975,974 A | * | 12/1990 | Nishijima et al. ........... 382/221 |
| 5,101,283 A | * | 3/1992 | Seki et al. ................... 358/3.13 |
| 5,701,364 A | * | 12/1997 | Kanno ........................... 382/176 |
| 5,781,658 A | * | 7/1998 | O'Gorman ................... 382/172 |
| 5,781,666 A | * | 7/1998 | Ishizawa et al. ............. 382/284 |
| 5,854,853 A | * | 12/1998 | Wang ............................ 382/176 |
| 6,157,736 A | * | 12/2000 | Jodoin et al. ................. 382/173 |
| 6,323,958 B1 | * | 11/2001 | Shimizu ........................ 358/1.9 |
| 6,389,163 B1 | * | 5/2002 | Jodoin et al. ................. 382/173 |
| 6,473,204 B1 | * | 10/2002 | Suzuki et al. ................. 358/448 |
| 2002/0054308 A1 | * | 5/2002 | Tanaka et al. ................ 358/1.9 |
| 2002/0126314 A1 | * | 9/2002 | Davidson et al. ............. 358/2.1 |

\* cited by examiner

BASIC MATRIX:K

CHARACTER PATTERN:P1

FONT PATTERN DATA

| BINARY | HEXADECIMAL |
|---|---|
| 00000000 | 0 × 00 |
| 00011000 | 0 × 18 |
| 00100100 | 0 × 24 |
| 00100100 | 0 × 24 |
| 00111100 | 0 × 3c |
| 01000010 | 0 × 42 |
| 01000010 | 0 × 42 |
| 00000000 | 0 × 00 |

CHARACTER PATTERN WITH SHADING : PA

BOLD FONT PATTERN DATA

| BINARY | HEXADECIMAL |
|---|---|
| 00000000 | 0 × 00 |
| 00011100 | 0 × 1c |
| 00110110 | 0 × 36 |
| 00110110 | 0 × 36 |
| 00111110 | 0 × 3e |
| 01100011 | 0 × 63 |
| 01100011 | 0 × 63 |
| 00000000 | 0 × 00 |

SHADING PATTERN : P2

BACKGROUND PATTERN : P3

FIG. 4

THRESHOLD ADDRESS TABLES : T

| THRESHOLD | ADDRESS | THRESHOLD | ADDRESS |
|---|---|---|---|
| 1 | 27 | 33 | 3 |
| 2 | 63 | 34 | 39 |
| 3 | 59 | 35 | 35 |
| 4 | 31 | 36 | 7 |
| 5 | 9 | 37 | 17 |
| 6 | 45 | 38 | 53 |
| 7 | 41 | 39 | 49 |
| 8 | 13 | 40 | 21 |
| 9 | 28 | 41 | 4 |
| 10 | 64 | 42 | 40 |
| 11 | 60 | 43 | 36 |
| 12 | 32 | 44 | 8 |
| 13 | 10 | 45 | 18 |
| 14 | 46 | 46 | 54 |
| 15 | 42 | 47 | 50 |
| 16 | 14 | 48 | 22 |
| 17 | 20 | 49 | 12 |
| 18 | 56 | 50 | 48 |
| 19 | 52 | 51 | 44 |
| 20 | 24 | 52 | 16 |
| 21 | 2 | 53 | 26 |
| 22 | 38 | 54 | 62 |
| 23 | 34 | 55 | 58 |
| 24 | 6 | 56 | 30 |
| 25 | 19 | 57 | 11 |
| 26 | 55 | 58 | 47 |
| 27 | 51 | 59 | 43 |
| 28 | 23 | 60 | 15 |
| 29 | 1 | 61 | 25 |
| 30 | 37 | 62 | 61 |
| 31 | 33 | 63 | 57 |
| 32 | 5 | 64 | 29 |

FIG. 6

| 40 | 37 | 43 | 49 | 42 | 39 | 44 | 51 |
|----|----|----|----|----|----|----|----|
| 27 | 33 | 59 | 12 | 2  | 17 | 60 | 55 |
| 45 | 52 | 5  | 18 | 48 | 11 | 21 | 36 |
| 61 | 56 | 1  | 16 | 64 | 13 | 15 | 32 |
| 41 | 38 | 8  | 9  | 7  | 4  | 22 | 50 |
| 29 | 3  | 24 | 54 | 28 | 34 | 14 | 23 |
| 47 | 10 | 20 | 35 | 46 | 53 | 6  | 19 |
| 63 | 58 | 26 | 31 | 62 | 57 | 25 | 30 |

THRESHOLD MATRIX
REPRESENTING "A" : MA

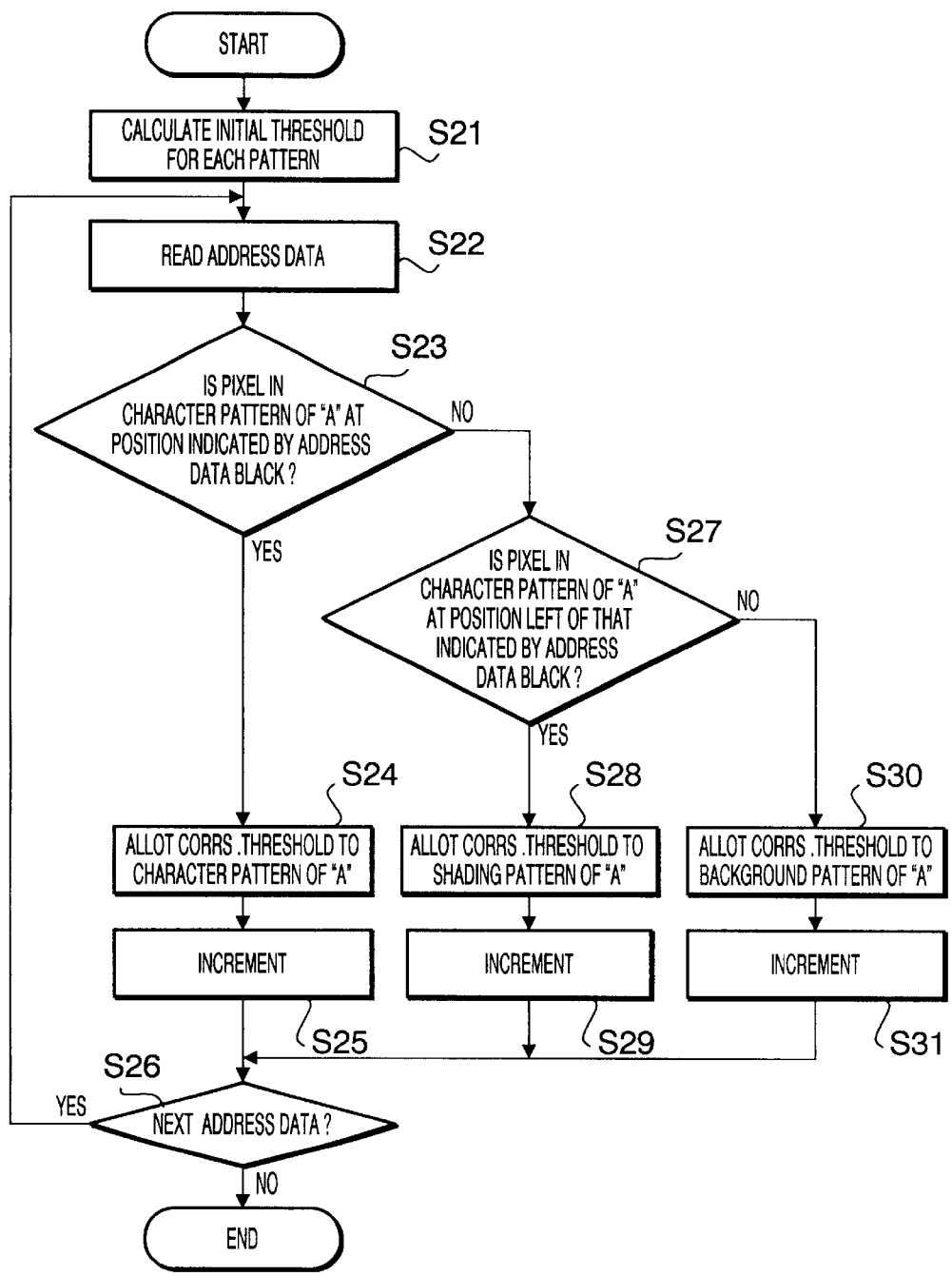

BASIC MATRIX:K

| 29 | 21 | 33 | 41 | 32 | 24 | 36 | 44 |
|----|----|----|----|----|----|----|----|
| 5  | 13 | 57 | 49 | 8  | 16 | 60 | 52 |
| 37 | 45 | 25 | 17 | 40 | 48 | 28 | 20 |
| 61 | 53 | 1  | 9  | 64 | 56 | 4  | 12 |
| 31 | 23 | 35 | 43 | 30 | 22 | 34 | 42 |
| 7  | 15 | 59 | 51 | 6  | 14 | 58 | 50 |
| 39 | 47 | 27 | 19 | 38 | 46 | 26 | 18 |
| 63 | 55 | 3  | 11 | 62 | 54 | 2  | 10 |

CHARACTER PATTERN:P1

EXTRACTED MATRIX : KP1

THRESHOLD MATRIX REPRESENTING CHARACTER PATTERN : M1

IMAGE PROCESSING APPARATUS, IMAGE PROCESSING METHOD, AND STORAGE MEDIUM THEREFOR

CROSS-REFERENCE TO RELATED APPLICATIONS

The present application claims priority under 35 U.S.C. 119 of Japanese Patent Application Nos. 10-329372 filed on Nov. 19, 1998 and 11-24898 filed on Feb. 2, 1999, the disclosures of which are expressly incorporated by reference herein in its entirety.

BACKGROUND OF THE INVENTION

1. Field of the Invention

The present invention relates to an image processing apparatus, and more specifically to an image processing apparatus that performs pseudo half-tone processing, to an image processing method therefor, and to a recording medium (computer usable medium) for storing a program that performs such processing.

2. Description of the Related Art

Dithering methods used in copy machines, facsimiles, and similar devices for binary conversion of gray-scale images are well known. Conventional dithering methods use a threshold matrix composed of arbitrarily selected threshold values to convert a gray-scale image into a bi-level image that resembles gray-scale.

One such method allows a certain pattern, such as an "A" character pattern, to be rendered in the output image when dithering is performed in the course of scanning and reproducing of image. As shown in FIG. 8A of the accompanying drawings, a base matrix K and data for the "A" character pattern P1 are first provided, and a second matrix KP1 (shown in FIG. 8B) of 14 thresholds for the "A" character is derived. This is accomplished by extracting from the base matrix K the threshold values for only pixels corresponding to the pixels of the character pattern "A". The 14 threshold values in the resulting extracted matrix KP1 are then re-indexed by a new set of thresholds (in this case from 1 to 14 from the smallest), yielding a final threshold matrix M1 (shown in FIG. 8C).

When this threshold matrix M1 for the "A" character pattern is then used to dither a uniform gray-scale image having image density of "14", the "A" character pattern P1 is properly made to appear in the output image.

The problem, however, is that when a threshold matrix M1 that represents only the "A" character pattern P1 is used for the dithering, the "A" character pattern may only appear distinctly within the output image when the source image contains a very narrow range of gray levels. Specifically, in the current example, the "A" will only be completely reproduced in the output image (i.e., the pixels representing the "A" character pattern in the output image will all be black, and surrounding pixels will be white) when all the pixels of the source image have image density of "14". In general, however, some pixels in the original character have image density less than "14", and therefore, the "A" character pattern may not be completely and distinctly rendered in the output image, and it may be difficult to identify the pattern P1 when it is printed on a recording sheet.

SUMMARY OF THE INVENTION

It is thus an object of the present invention to provide an image processing apparatus capable of reliably reproducing an original image in an output image (on a recording sheet) when processing a source image having a wide range of gray-scale values.

Another object of the present invention is to provide an image processing method therefor.

Still another object of the present invention is to provide a recording medium for storing a program which performs such processing.

According to a first aspect of the present invention, there is provided an image processing apparatus for performing pseudo half-tone processing, that comprises a storage unit for storing a base matrix and data for font pattern relating to an original image, and a threshold matrix generating unit for generating a threshold matrix capable of rendering (reproducing) an original image having a wide range of gray-scale levels based on the base matrix and the font pattern data. This image processing apparatus can reproduce an original image on a recording sheet even if the original image has a wide range of gray-scale levels. The original image may be a character, symbol, mark, sentence, etc.

The storage unit may further store a threshold address table, and the threshold matrix generating unit may also refer to the threshold address table when it generates the threshold matrix. The threshold address table may contain address data arranged from lowest threshold value to highest. The threshold matrix obtained by using such threshold address table may be employed when reproducing an original image in an image density in proportion to the image density of the original image. Alternatively, the threshold address table may contain the address data arranged from highest threshold value to lowest. A threshold matrix obtained from such threshold address table may be used when printing an image having image density in inverse proportion to the image density of the original image.

According to a second aspect of the present invention, there is provided an image processing method for use in an image processing apparatus which performs pseudo half-tone processing, comprising the steps of initializing threshold values for a character pattern (original image), a shadow pattern and a background pattern using font pattern data, and reassigning the threshold values in the character pattern, the shadow pattern, and the background pattern based on a base matrix. This image processing method can enable an original image to be rendered in an output image even if the original image contains a wide range of gray-scale levels. The threshold values may be reassigned based on threshold addresses derived from the base matrix.

According to a third aspect of the present invention, there is provided another image processing method for use in an image processing apparatus which performs pseudo half-tone processing, comprising the step of initializing threshold values for an original image pattern (e.g., character pattern), its shadow pattern and background pattern, respectively, the step of sequentially reading out address data from a threshold address table, and the step of reallocating the threshold values of said patterns based on the data read from the threshold value address table. With this method, an original image is reliably rendered in an output image even when the original image contains multiple levels of gray.

According to a fourth aspect of the present invention, there is provided a program storage medium for a computer such that the computer is able to function as a module for storing a base matrix and font pattern data and another module for generating a threshold matrix that can reproduce an original image even if the original image contains a wide range of gray-scale levels (or image density), based on the base matrix and the font pattern data.

BRIEF DESCRIPTION OF THE ACCOMPANYING DRAWINGS

FIG. 4 illustrates a threshold address table.

FIG. 6 depicts the threshold matrix generated when the program described by FIG. 5 is executed.

FIG. 7 is a flow chart showing an alternate embodiment of a method for generating the threshold matrix.

DETAILED DESCRIPTION OF THE INVENTION

Embodiments of the present invention will now be described with reference to the accompanying drawings.

The First Embodiment

Figure 1:
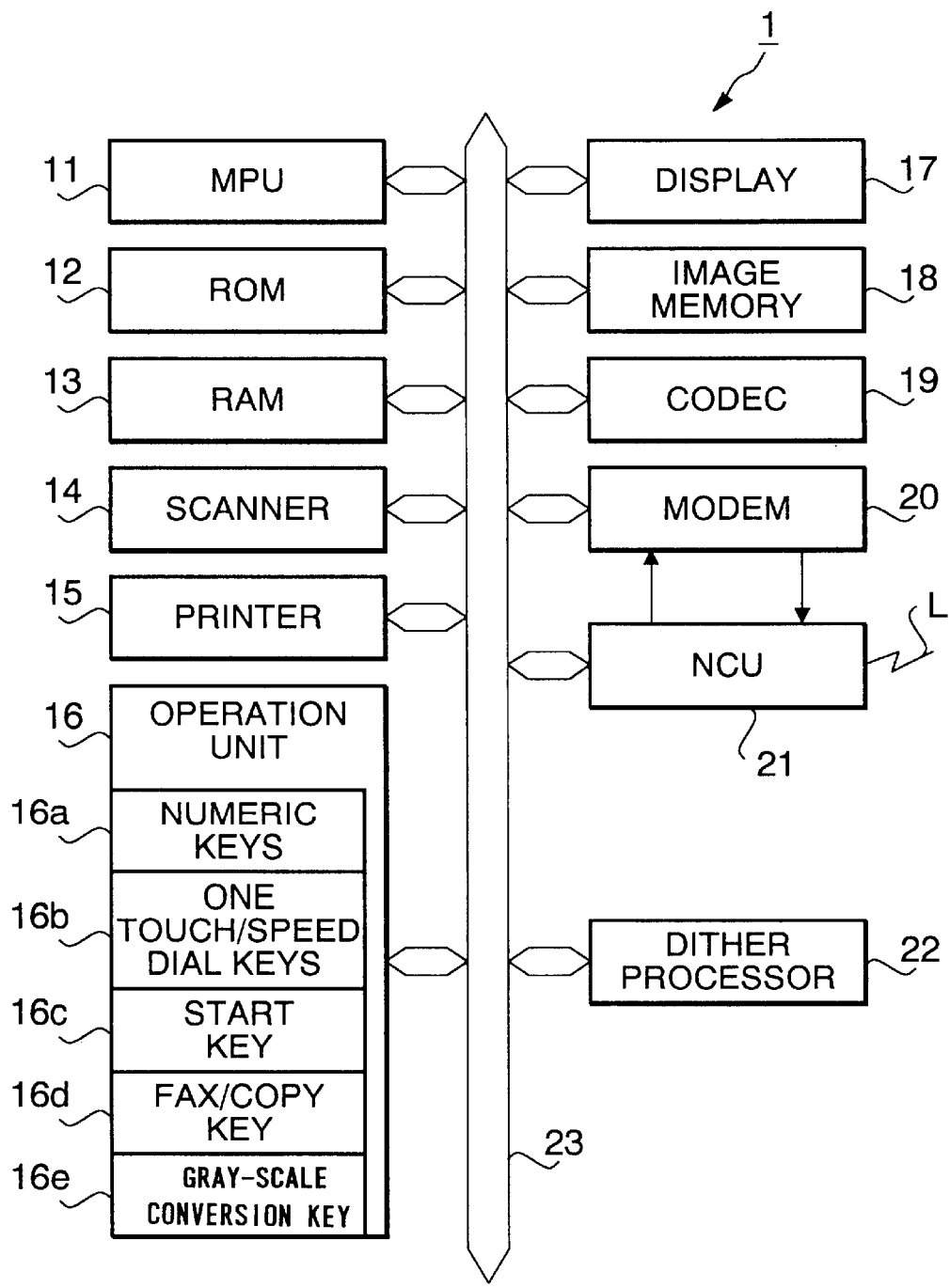
FIG. 1 is a circuit diagram of a facsimile machine according to first and second embodiments of the present invention.

A first embodiment demonstrating the present invention employed in a facsimile machine will now be described with reference to the accompanying drawings.
1. Structure of the Facsimile Machine As shown in FIG. 1, a facsimile machine 1 (the image processing apparatus) is principally comprised of MPU 11, ROM 12, RAM 13, scanning unit 14, recording unit 15, operation unit 16, display unit 17, image memory 18, CODEC 19, modem 20, NCU 21, and dithering unit 22. Each of these elements 11-22 are connected over BUS 23.

MPU 11 controls the various elements that comprise the facsimile machine 1. ROM 12 stores programs used to control the machine 1, as well as the various essential data required to generate the threshold matrices which express the characters described below. RAM 13 temporarily stores various data of the machine 1. Together MPU 11, ROM 12, and RAM 13 comprise the "generating unit" of the present invention.

The scanning unit 14 scans-in image data from a document, and converts the multi-bit depth data of the scanned image to binary halftone image data through fixed threshold binary conversion, dithering, or similar process, based on the processing mode.

The recording unit 15 prints out onto a recording sheet image data that has either been received from a remote source, or scanned in by the scanning unit 14 to make a copy. The printing unit 15 may be an electrophotographic printer, thermal printer or ink jet printer.

The operation unit 16 contains a numeric key pad 16a (including star and pound keys) for inputting facsimile telephone numbers and the like; speed-dial keys 16b for storing and dialing speed-dial numbers for facsimile transmissions; a start key 16c for initiating a document scanning operation; a transmission/copy key 16d for setting the operating mode of the machine (to either facsimile transmission mode or copy mode); a gray-scale conversion key 16e for setting the processing mode for the scanned image data to gray-scale conversion mode; and various other operating keys. The display unit 17, comprised of an LCD or the like, is provided to display information such as the operating mode of the machine 1.

The image memory 18 temporarily stores image data that has either been received from a remote source or read-in by the scanning unit 14 and coded by CODEC 19 with MMR, MR, or MH coding schemes. CODEC 19 encodes data scanned by the scanning unit 14 using one of these aforementioned coding methods for transmission to a remote party, or decodes image data received from a remote source.

The modem 20 modulates and demodulates data that is either transmitted or received according to V.17, V.27ter, or V.29 or similar standards based on the facsimile transfer protocols of ITU-T recommendation T.30. NCU21 controls connection and disconnection of the machine 1 to telephone line L, and also sends dialing signals to dial and detects ring signals from remote facsimile machines.

The dithering unit 22 dithers multi-bit depth data scanned in by the scanning unit 14 when a user sets the machine to gray-scale conversion mode by pressing the half-tone key (gray-scale conversion mode key) 16e of operation unit 16.

Data stored in ROM 12 required to generate the threshold matrices that render character patterns will now be described.

Figure 2A:
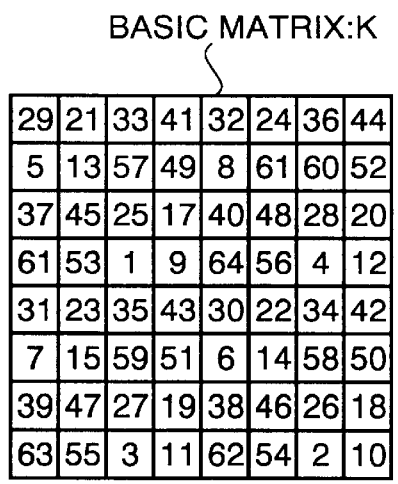
FIG. 2A illustrates a base matrix used in the embodiments of this invention.

ROM 12 stores an 8×8 base matrix K containing 64 distinct thresholds, as shown in FIG. 2A, as well as hexadecimal font pattern data. The font pattern data represents the specific character pattern shown in FIG. 2B. The font pattern data may be stored as binary data (with 1 expressing black pixels, and 0 expressing white pixels) for each line, or in line-encoded hexadecimal form.

Figure 2B:
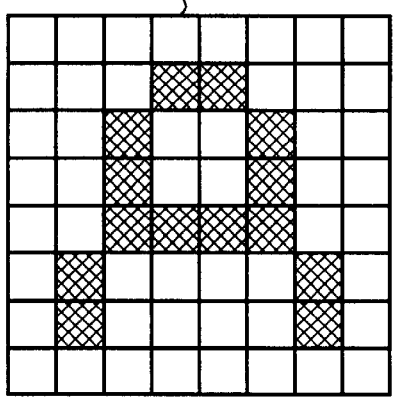
FIG. 2B shows an "A" character pattern, and font pattern data for the character pattern.
Figure 3A:
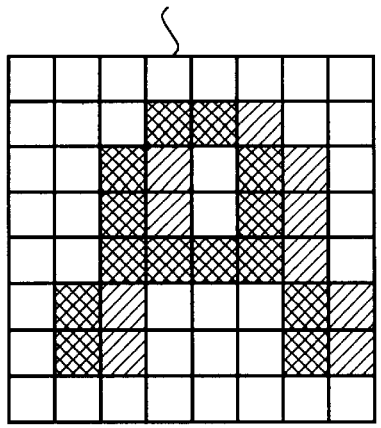
FIG. 3A shows the character pattern of FIG. 2B with shading, and font pattern data for the shaded pattern.

In order to avoid the problems of the conventional systems described hereinbefore, when dithering is performed using only the predetermined character pattern shown in FIG. 2B, the range of image density sufficient to perfectly reproduce the "A" character pattern is widened. This is accomplished, as shown in FIG. 3A, by adding a shadow to the "A" character pattern P1, as indicated by the boxes with unidirectional lines. Pixels immediately to the right of the black pixels of the character pattern are turned black in order to create the effect of shading behind the lines of the character from the illumination of a light source positioned to the left of the character. In this case, 10 additional black pixels are added to the 14 pixels of the "A" character pattern P1. These additional pixels make it possible to reproduce the "A" pattern P1 or "A"-with-shading pattern PA when the image density value of the original image falls within 14 to 24. In other words, a plurality of character patterns having different faces (boldfaced and lightface) are prepared for the "A" character pattern P1. As an additional advantage, therefore, it is feasible to reproduce the "A" character pattern P1 in a bold font.

The shadowed character pattern is stored in ROM 12 as hexadecimal-formatted "bold" font pattern data. In the illustrated example, each pixel of each line of this bold font pattern data is assigned a binary value of 1 for black, and then each line is expressed in hexadecimal format.

Figure 3B:
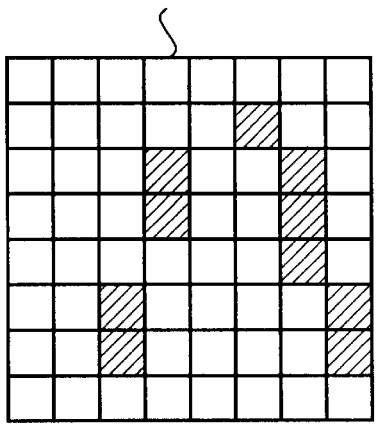
FIG. 3B is the shading pattern of the shaded pattern shown in FIG. 3A.

Referring to FIG. 3B, the shading pattern indicated by the unidirectional slanted lines in FIG. 3A is referred to as a shading pattern P2. As can easily be seen, the shaded character pattern PA (FIG. 3A) is simply an amalgamation of the character pattern P1 with the shading pattern P2.

Figure 3C:
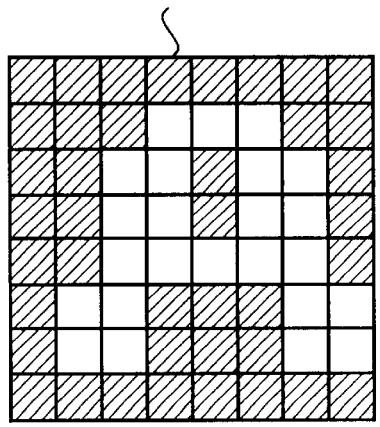
FIG. 3C illustrates the background pattern of the shaded pattern shown in FIG. 3A.

Referring to FIG. 3C, a background pattern P3 is generated by removing the shaded pattern PA from the base matrix K shown in FIG. 2A.

Referring to FIG. 4, a threshold address table T which lists the address in the base matrix K for each of the 64 threshold values in the matrix (in order from lowest to highest threshold) is also stored in the ROM 12. The address in the table T indicates the corresponding cell in the base matrix K, starting from the top left corner, moving across each consecutive line. The address increases one by one so that the addresses of 1 to 64 are shown in the table T of FIG. 4 for the 8×8 matrix K of FIG. 2A.

2. A First Method for Generating the Threshold Matrix

A first method of generating the threshold matrix MA for a particular character (in this case an "A") will now be described with reference to the flow chart in FIG. 5. It should be noted that when the present invention is employed in the facsimile machine of the first embodiment, this procedure is executed by programs stored in the ROM 12 under control of the MPU 11. Although the font pattern data in the form of hexadecimal as shown in FIG. 2B and the bold font pattern data in the form of hexadecimal as shown in FIG. 3A are stored in ROM 12, the following description deals with the character pattern P1 shown in FIG. 2B and the character pattern with shading PA shown in FIG. 3A for the sake of easier explanation.

At step S1, initial threshold values NA, NB and NC are calculated for the "A" character pattern P1, shading pattern P2 and background pattern P3, respectively. Specifically, 1 is first selected as the initial threshold NA for the "A" character pattern P1 by calculation, and 15 is obtained as the initial threshold NB for the shading pattern P2. There are 14 black pixels in the font pattern data of the character pattern P1 as shown in FIG. 2B. Therefore, 15 which is acquired by adding 1 (initial value NA) and 14 is the initial value NB for the shading pattern P2. Further, 25 is obtained for the initial value NC for the background pattern P3. There are 24 black pixels in the bold font pattern data of the shaded character pattern PA as shown in FIG. 3A. Therefore, 25 which is acquired by adding 1 (initial value NA) to 24 is the initial value NC for the background pattern P3.

This method renders the specified pattern (in this case the character "A") in the output image by re-allocating threshold values for the cells of the dithering pattern, cell by cell, based on whether each particular pixel would correspond to part of the original specified pattern P1, part of the shaded pattern P2, or part of the background P3.

Since there are 14 cells corresponding to 14 pixels of the "A" character pattern P1, the threshold values for these cells will be set to the lowest 14 values (1–14). The 10 cells corresponding to the shaded pattern P2 will be assigned the next lowest values (15–24), and the remaining cells, corresponding to the background pattern P3, will be assigned the sequentially higher values (25–64).

Since the program will move from line to line in the threshold matrix table T, three separate counters may be used for each pattern P1, P2, and P3, and a looped counter may be used to move from line to line in the table T. The initial values of each pattern maybe set according to the preceding description such that the initial value for P1 thresholds is set to 1, the initial value for P2 thresholds is set to 15, and the initial value of P3 thresholds is set to 25. The counters for each threshold can be increased by 1 each time a value is assigned for that pattern until the final threshold value allocated for that pattern is reached.

At step S2, the address corresponding to the threshold value is read out from the threshold address table T (shown in FIG. 4) stored in ROM 12. During the first iteration of the loop of the present embodiment, for example, the threshold value would be 1, and the corresponding address would be 27.

At step S3, it is determined whether or not the pixel corresponding to the current address (the address read out from the address table at step S2) is part of the shaded character pattern PA. If the pixel at the current address should be black, then the program proceeds to step S4, and if not, it is determined that the pixel at the current address belongs to the background pattern P3, and moves to step S10. During the first iteration of the loop, the pixel corresponding to address 27 in character pattern PA (the third cell of the third line of FIG. 3A) is black, so the program would proceed directly to step S4.

At step S4, it is determined whether or not the pixel corresponding to the current address is part of the character pattern P1. If in the specified character pattern P1, the pixel at the current address is black, the program moves to step S5, and if not, it is determined that the pixel at the current address belongs to the shadowing pattern P2, and the program proceeds to step S8. During the first iteration of the loop, for example, the pixel corresponding to address 27 in character pattern P1 (the third cell of the fourth line of FIG. 2B) is black, so the program would proceed to step S5.

At step S5, since the pixel at the current address belongs to the character pattern P1, it is assigned the lowest available threshold value allocated for character pattern P1 pixels (i.e. the lowest unassigned value from 1 to 14). During the first iteration of the loop, for example, since no value has yet been assigned, the lowest value is 1. Consequently, the threshold value of address 27 would be set to 1, as indicated in the matrix of FIG. 6. (Notice that the threshold value of address 27, the $3^{rd}$ cell of the $4^{th}$ line is 1.) After allocating the threshold value to the current cell, the program then proceeds to step S6.

At step S6, the current threshold for the character pattern P1 is increased by 1. In other words, in the first iteration, the current threshold would be increased from 1 to 2, and the lowest unassigned value of P1 pixels would then be 2.

Next, at step S7, it is determined whether or not there is address data remaining in the threshold address table T. If there is additional address data to be read, the program returns to step S2 and reads the address data for the next threshold value. If, on the other hand, thee is no remaining address data to be read, the program determines that all the current threshold values have been assigned, and the program ends.

If at step S4 it is determined that the pixel corresponding to the current address read out from the threshold address table T does not belong to the character pattern P1 (Step S4, NO), and therefore belongs to the shadowing pattern P2, then at step S8, the pixel at the current address is assigned the lowest available threshold value allocated for shadowing pattern P2 pixels (i.e. the lowest unassigned value from 15 to 24). For example, during the fourth iteration, the current address is 31, and therefore the pixel would be allocated the lowest available threshold value, 15. The program then proceeds to step S9.

At step S9, the current threshold for the shading pattern P2 is increased by 1. In other words, in the fourth iteration, the threshold would be increased from 15 to 16.

If at step S3 it is determined that the pixel corresponding to the current address read out from the threshold address table T does not belong to shaded character pattern PA (Step S3, NO), and therefore belongs to part of the background pattern P3, then at step S10, the pixel at the current address is assigned the lowest available threshold value allocated for background pattern P3 pixels (i.e. the lowest unassigned value from 25 to 64). For example, during the second iteration, the current address is 63, and therefore the pixel would be allocated the lowest available threshold value, 25. The program then proceeds to step S11.

At step S11, the current threshold for the background pattern P3 are increased by 1. In other words, in the second iteration, the threshold would be increased from 25 to 26.

Figure 5:
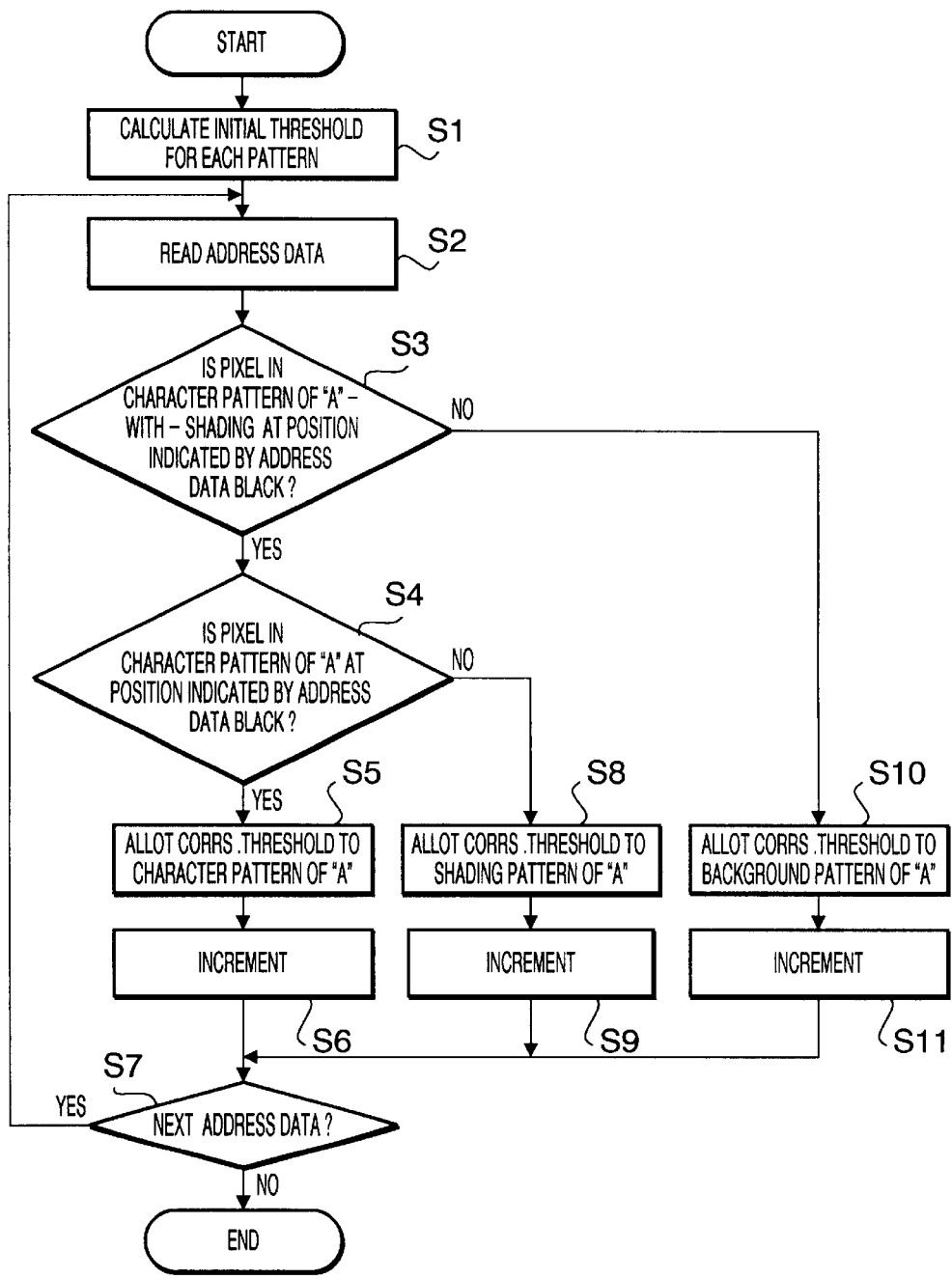
FIG. 5 is a flow chart showing a first embodiment of a method for generating the threshold matrix which is used to render the "A" character pattern.
Figure 8A:
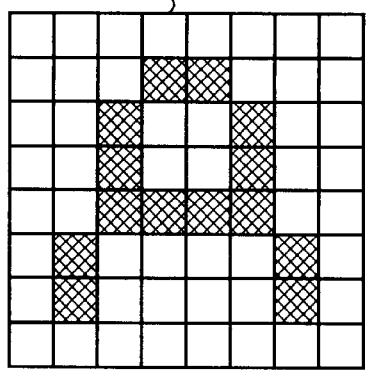
FIG. 8A shows a prior art base matrix and the character pattern it is meant to express.
Figure 8B:
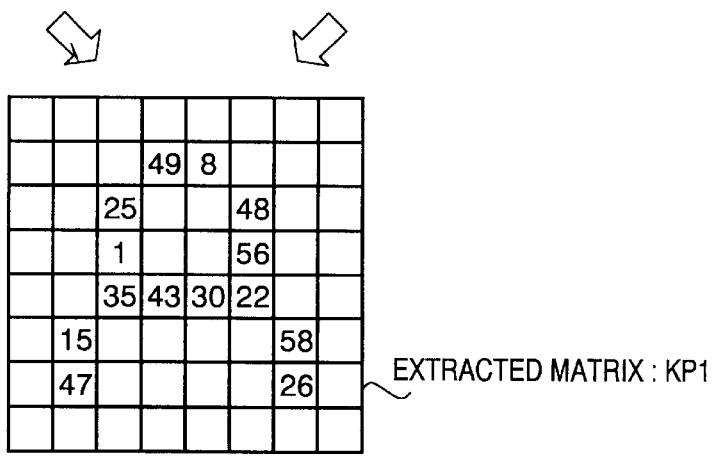
FIG. 8B shows a threshold matrix extracted from the base matrix K shown in FIG. 8A.
Figure 8C:
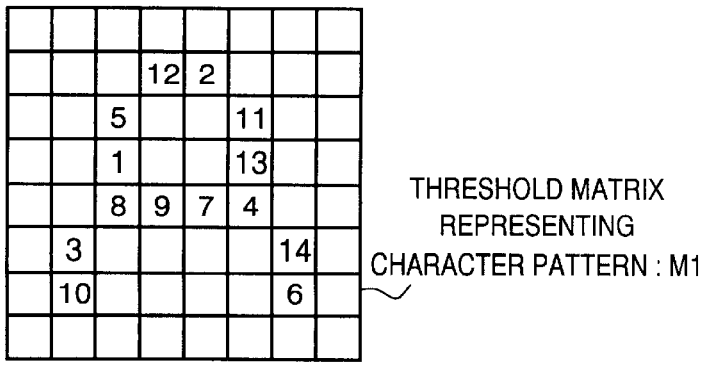
FIG. 8C shows a reordered threshold matrix of FIG. 8B that is used to express the character pattern of FIG. 8A.

Processing of all of the thresholds and corresponding addresses in the threshold address table T, as indicated by the flow chart in FIG. 5, yields the new threshold matrix MA, shown in FIG. 6. Using this new threshold matrix MA when dithering is performed by the dithering unit 22 allows the original "A" character pattern to be rendered even when the source image contains a wide range of gray levels.

According to the first embodiment of the present invention, a shadow P2 is attached to the original character pattern P1 to prepare a character pattern with the shadow, PA. This shadow portion allows the "A" pattern (original image) to be reproduced or printed more darkly (in bold) when the original gray-scale image is processed by the dithering unit 22 and printed on a recording sheet by the printer 15, and the gray-scale image appropriately reproduced by the printer can have a broader range of gray-scale levels.

Additionally, since a second threshold matrix MA for rendering the original pattern can be derived from the base matrix K (FIG. 2A), the character pattern P1 (FIG. 2B), the shadowed pattern PA (FIG. 3A), and the threshold address table T (FIG. 4), such a matrix need not be stored in ROM. Thus, an arbitrary pattern generating matrix can be generated from only the base matrix K, the original character pattern P1, the shadowed pattern PA, and the threshold address table T. Consequently, this reduces the memory needs of a device employing this invention.

Still further, it should be apparent that since the second threshold matrix MA reallocates the threshold values of the base matrix K, the threshold values of the base matrix K may be set arbitrarily. Therefore, no matter what kind of base matrix K is used, a new threshold matrix that renders the specified pattern can still be generated as long as the base matrix K is comprised of different threshold values.

3. A Second Method for Generating the Threshold Matrix

A second embodiment of the method for generating the threshold matrix used to render the specified pattern, again employed in a facsimile machine, will now be described in reference to the accompanying drawings. Note that the same reference numbers have been used for elements common to both the first and second embodiments.

In the second embodiment, the ROM 12 does not store the shadowed pattern data (FIG. 3A), as in the first embodiment, but only the base matrix K (FIG. 2A), the regular font pattern data (FIG. 2B) for the specified character, and the threshold address table T (FIG. 4).

Generation of the threshold matrix MA used to render the specified pattern (again, an "A" character pattern) onto an output image will now be described with reference to the flow chart in FIG. 7. Note that this procedure is executed by programs stored in the ROM 12 under control of the MPU 11. Although the font pattern data in the form of hexadecimal as shown in FIG. 2B is stored in ROM 12, the following description deals with the character pattern P1 shown in FIG. 2B for the sake of easier understanding.

At step S21, initial threshold values NA, NB and NC for the "A" character pattern P1, its shading pattern P2 and background pattern P3 are obtained by calculation, respectively. Specifically, 1 is first selected as the initial value NA for the character pattern P1, and 15 is obtained as the initial value NB for the shading pattern P2. There are fourteen black pixels in the font pattern of the "A" character pattern P1 as shown in FIG. 2B. Therefore, adding 1 (initial value NA) to 14 provides 15. This 15 is the initial value NB for the shading pattern P2.

This method renders the specified pattern (in this case the character "A") in the output image by re-allocating threshold values for the cells of the dithering pattern, cell by cell, based on whether each particular pixel would correspond to part of the original specified pattern P1, a white pixel determined to be immediately to the right of a black pixel of the specified pattern P1, or part of the background P3 of the specified pattern not immediately to the right of a black pixel of the specified pattern P1

Since there are 14 cells corresponding to the 14 pixels of the "A" character pattern P1, the threshold values for these cells will be set to the lowest values (1–14). The 10 cells corresponding to white pixels immediately to the right of a black cell in the specified "A" character pattern are assigned the next lowest values (15–24), and the remaining cells are will be assigned the sequentially higher values (25–64).

Since the program will move from cell to cell in the threshold matrix table T, three separate looped counters (one for each of the three aforementioned allocated groups of pixels) may be used. The initial values of each of the three pixel groups may set to 1, 15, and 25, respectively. In the present embodiment, this occurs at step S21. The counters for each threshold can be increased by 1 each time a value is assigned, as described hereinbelow.

At step S22, the address corresponding to the current threshold value is read out from the threshold address table T stored in ROM 12. During the first iteration of the loop, the threshold value would be 1, and the corresponding address would be 27.

At step S23, it is determined whether or not the pixel corresponding to the current address (the address read out from the address table at step S2) is part of the character pattern P1. If the pixel at the current address should be black, then that cell belongs to the specified pattern P1, and the program continues to step S24; but if the pixel at the current address should be white, then it belongs to either the shading pattern P2 or the background pattern P3, and the program proceeds to step S27.

The processing executed at steps S24–S26 is similar to the processing executed at steps S5–S7 in the first embodiment. At step S27, the program determines whether or not the pixel immediately to the left of the pixel at the current address should be black (i.e. if the pixel immediately left of the current address belongs to the specified pattern P1). In other words, the program determines if the pixel at the current address corresponds to what would be the shadow pattern P2 of the specified character pattern P1. If the pixel immediately left is black, then it can be determined that the pixel belongs to the shadow of the specified pattern P1, and the program proceeds to step S28. If not, then the program determines that the pixel belongs in the background pattern P3, and the program proceeds to step S30. When there is no pixel on the left, the program also proceeds to step S30.

The processing at steps S28, S29, S30, and S31 correspond, respectively, to the processing steps S8, S9, S10, and S11 of the first embodiment.

When processing is completed, the same threshold matrix MA is derived, and this threshold matrix can then be used to render the specified pattern P1 upon an output image when the source image is dithered by the dithering unit 22. As in the first embodiment, the threshold matrix MA allows the specified pattern P1 to be more reliably rendered over a relatively wider range of levels of gray.

The second embodiment provides the following advantages in addition to the advantages of the first embodiment. The threshold matrix MA which renders the specified pattern (in this case, an. "A" character pattern) can thus be derived based on a base matrix K (shown in FIG. 2A), a specified pattern P1 (shown in FIG. 2B), and a threshold address table T (shown in FIG. 4). Therefore, the threshold matrix MA is not stored in the memory of the facsimile machine 1. In other words, an arbitrary threshold matrix MA is obtainable as far as the base matrix K, character pattern P1 and threshold address table T are stored. Accordingly, the memory needs of the facsimile machine 1 in this embodiment can be even further reduced as compared with the first embodiment.

4. Alternate Embodiments and Modifications

It should be noted that either of these two embodiments may be modified as follows without department from the spirit of the present invention.

At either step S2 in the first embodiment or step S22 in the second, instead of referencing an address from the threshold address table T, the addresses for the thresholds 1–64 may be obtained from the base matrix K. Thus, at step S7 in the first embodiment, and step S26 in the second embodiment, instead of determining whether or not there is another address, the program may determine whether or not there is another threshold. Comprising the invention in this manner permits the omission of the threshold address table T in ROM 12, and enables the memory needs of a device that employs the present invention to be reduced even further.

It should be readily apparent that the pattern used in the present invention could be any type of character or pattern (numeric, Japanese kana or kanji, parts of other foreign scripts, expressions, logos, or other patterns).

It should further be apparent that when using a character pattern, any type of font or font style may be used, including serif and sans-serif style Western scripts, Mincho (Ming), Gothic, Maru-gothic, and other Japanese style scripts, italics, bold-face, strike-through, raised, 3-D, beveled, and other types of text styles, and may include any types of glyphs or variant forms of characters.

It should also be apparent that the specified pattern may include phrases, sentences and other types of messages, thus allowing this invention to be used in advertising business.

It should further be appreciated by those skilled in the art that the present invention need not be limited to a 64-threshold 8×8 base matrix K, but may alternatively employ a 16×16 or 32×32 base matrix K. Such a matrix would be advantageous when rendering images having fonts requiring a large number of pixels, such as with Chinese characters.

It should be further noted that the need for creating a shadowed pattern may be obviated, and the second threshold matrix derived without it, when the specified pattern contains a large number of pixels, as may be the case when using Chinese characters.

It should further be noted that the invention may be adapted such that when the source image has a very small image density and possesses a half tone color, a set of new threshold values may be employed such that the original pattern is reproduced more darkly. In other words, by allotting a new set of threshold values according to the gray-scale levels of the source image in a trail-and-error manner, rendering of the specified pattern on the output image may be adjusted to appear more darkly or more lightly to account for such variation.

The present invention may also be adapted such that, through the use of different shadow patterns for a single specified pattern, the range of gray scale levels in the original image, which the facsimile machine 1 can reproduce properly, is widened in response to the font size of the specified pattern. In other words, if the font of a specified character is small (under 18 point, for example), the number of shadowed patterns may be reduced accordingly, and conversely, when the font is large (over 18 point, for example), the number of shadowed patterns may be increased.

It should also be apparent to those skilled in the art that the shadow pattern need not be created to the right of the pixels of the specified pattern, as described in the embodiments herein, but may alternatively be created to the left of the specified pattern, or elsewhere around the pattern. Two or more of the shadow patterns on the right, left, top or bottom of the specified pattern may be used in combination.

Further, it should be noted that the threshold address table T need not be arranged in ascending order of the threshold values of the base matrix K, but may alternatively be arranged in descending order. This may produce a negative image effect, and the resulting threshold matrix is used when printing a white letter in the black background. In other words, a threshold matrix which is derived inversely to the gray-scale level of the source image is obtained.

It should also be apparent that although in steps S3 and S4 in the first embodiment and steps S23 and S27 in the second embodiment the program determines whether or not the address corresponds to a black pixel in the specified pattern, the program may alternatively determine whether or not the address corresponds to a white pixel. A threshold pattern in reverse to the gray-scale level of the source image is also obtainable in this manner.

It should still further be noted that although the font pattern data described in the embodiments herein have been in hexadecimal format, the data may also appear in binary, decimal or other format.

It should also be noted that instead of using an 8×8 base matrix K with threshold values from 1–64, different threshold value ranges may be used. If, however, 0–63 are selected as the thresholds, one pixel is always recognized as black even when the original image is perfectly white since threshold 0 is included. To avoid this, the thresholds of 1, 1, 2, 3, 4, . . . , 63 may be employed.

It should further be noted that the term "storage medium" is a computer usable medium and includes read-only storage mediums, semiconductors, magnetic tapes, optical storage devices, computer programs, etc. More specific examples include but are not limited to CD-ROMs, semi-conductor based ROMs, floppy disks, hard disks, optical disks, magnetic disks and tapes, etc.

What is claimed is:

1. An image processing apparatus that performs pseudo half-tone processing, the apparatus comprising:

a storage unit that stores a base matrix and font pattern data for a specified pattern;

means for setting initial threshold values for a source image pattern, a shadow pattern added to the source image pattern, and a background pattern, respectively, based on font data pattern;

a threshold matrix generating unit that generates a threshold matrix capable of rendering the specified pattern in an output image over a wide range of gray-scale levels based on the base matrix and the font pattern data, and means for reassigning the threshold values for a source image pattern, a shadow pattern added to the source image pattern, and a background pattern, respectively, based on a base matrix.

2. The image processing apparatus of claim 1 wherein a threshold address table is stored in the storage unit, and the threshold matrix is generated based on the base matrix, the font data pattern, and the threshold address table.

3. The image processing apparatus of claim 2 wherein the address data in the threshold address table is stored from the lowest threshold value to the highest threshold value.

4. The image processing apparatus of claim 2 wherein the address data in the threshold address table is stored from the highest threshold value to the lowest threshold value.

5. An image processing method for use in an image processing apparatus adapted to perform a pseudo half-tone processing, the method comprising the steps of:

setting initial threshold values for a source image pattern, a shadow pattern added to the source image pattern, and a background pattern, respectively, based on font data pattern; and reassigning the threshold values for a source image pattern, a shadow pattern added to the source image pattern, and a background pattern, respectively, based on a base matrix.

6. The image processing method of claim 5 wherein the reassigning the threshold values based on the base matrix includes reading the address of a threshold from the base matrix, and processing based on the address read from the base matrix.

7. The image processing method of claim 5 wherein the source image is a character, symbol, mark or sentence.

8. An image processing method for use in an apparatus adapted to perform a pseudo half tone processing, comprising the steps of:

setting initial threshold values for a source image pattern, a shadow pattern attached to the source image pattern, and a background pattern, respectively, based on font data pattern;

retrieving address data sequentially from a threshold address table; and reassigning the threshold values for a source image pattern, a shadow pattern attached to the source image pattern, and a background pattern, respectively, based on the address data.

9. The image processing method of claim 8 wherein the source image is a character, symbol, mark or sentence.

* * * * *